(12) United States Patent
Jeong et al.

(10) Patent No.: US 10,749,806 B2
(45) Date of Patent: *Aug. 18, 2020

(54) METHOD AND APPARATUS FOR EFFECTIVE WIRELESS LAN SELECTION

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,300

(22) Filed: Feb. 4, 2019

(65) Prior Publication Data

US 2019/0173797 A1 Jun. 6, 2019

Related U.S. Application Data

(63) Continuation of application No. 14/782,782, filed as application No. PCT/KR2014/004506 on May 20, 2014, now Pat. No. 10,200,285.

(30) Foreign Application Priority Data

May 20, 2013 (KR) .................. 10-2013-0056419
Nov. 1, 2013 (KR) .................. 10-2013-0132317

(51) Int. Cl.
*H04L 12/803* (2013.01)
*H04W 48/18* (2009.01)
(Continued)

(52) U.S. Cl.
CPC .......... *H04L 47/125* (2013.01); *H04W 28/08* (2013.01); *H04W 40/02* (2013.01); *H04W 48/16* (2013.01);
(Continued)

(58) Field of Classification Search
CPC ..... H04W 40/02; H04W 28/08; H04W 48/16; H04W 84/12; H04W 48/18; H04L 12/803; H04L 47/125
See application file for complete search history.

(56) References Cited

U.S. PATENT DOCUMENTS 9,491,660 B2    11/2016  Zhao et al.
2007/0089161 A1  4/2007  Waris
(Continued)

FOREIGN PATENT DOCUMENTS

CN    102007801 A    4/2011
CN    102450087 A    5/2012
(Continued)

OTHER PUBLICATIONS

International Search Report dated Aug. 25, 2014 in connection with International Patent Application No. PCT/KR2014/004506, 5 pages.
(Continued)

*Primary Examiner* — Chi Ho A Lee

(57) ABSTRACT

A method for selecting an access network in a terminal of a mobile communication system according to one embodiment of the present specification comprises the steps of: if traffic is generated in the terminal, selecting an access network according to the characteristics of the generated traffic and network selection policy information; and transmitting and receiving the generated traffic via the selected access network. According to the embodiment, the present invention adjusts priorities of accesses given to users and applications in a wireless communication system including heterogeneous networks, thereby reducing processes for reselecting an access network of a user terminal, and reducing the cases of unnecessarily accessing a network having a low priority or requiring high costs for a long time. There-
(Continued)

fore, the present invention can enhance user convenience and improve communication efficiency.

12 Claims, 14 Drawing Sheets

(51) Int. Cl.
  *H04W 28/08* (2009.01)
  *H04W 40/02* (2009.01)
  *H04W 48/16* (2009.01)
  *H04W 84/12* (2009.01)
  *H04W 36/22* (2009.01)
(52) U.S. Cl.
  CPC ............ *H04W 48/18* (2013.01); *H04W 36/22* (2013.01); *H04W 84/12* (2013.01)

(56) References Cited

U.S. PATENT DOCUMENTS

| | | |
|---|---|---|
| 2010/0302958 A1 | 12/2010 | Wietfeldt et al. |
| 2011/0085498 A1 | 4/2011 | Oba et al. |
| 2011/0096688 A1 | 4/2011 | Sachs et al. |
| 2011/0216743 A1 | 9/2011 | Bachmann et al. |
| 2011/0261785 A1 | 10/2011 | Kwon et al. |
| 2012/0140651 A1 | 6/2012 | Nicoara et al. |
| 2012/0257598 A1 | 10/2012 | Karampatsis et al. |
| 2013/0007853 A1 | 1/2013 | Gupta et al. |
| 2013/0089076 A1 | 4/2013 | Olvera-Hernandez et al. |
| 2013/0322238 A1 | 12/2013 | Sirotkin |
| 2013/0322300 A1 | 12/2013 | Landais et al. |
| 2013/0337808 A1 | 12/2013 | Zhao et al. |
| 2014/0004863 A1 | 1/2014 | Zhang et al. |
| 2014/0022898 A1 | 1/2014 | Kim et al. |
| 2014/0155078 A1 | 6/2014 | Balageas et al. |
| 2014/0161103 A1 | 6/2014 | Sirotkin et al. |
| 2014/0169330 A1 | 6/2014 | Rommer et al. |
| 2014/0198657 A1 | 7/2014 | Ji |
| 2014/0204758 A1 | 7/2014 | Zhu et al. |
| 2014/0256329 A1 | 9/2014 | Cao et al. |
| 2014/0295913 A1 | 10/2014 | Gupta |
| 2014/0351880 A1 | 11/2014 | Low et al. |
| 2015/0003420 A1 | 1/2015 | Vangala et al. |
| 2016/0021605 A1 | 1/2016 | Kim et al. |
| 2016/0021606 A1 | 1/2016 | Gupta |
| 2016/0113015 A1 | 4/2016 | Wu |
| 2017/0181027 A1 | 6/2017 | Raleigh et al. |

FOREIGN PATENT DOCUMENTS

| | | |
|---|---|---|
| CN | 102771146 A | 11/2012 |
| CN | 103038651 A | 4/2013 |
| EP | 2445266 A1 | 4/2012 |
| GB | 2468469 A | 9/2010 |
| KR | 20080058380 A | 6/2008 |
| KR | 20080095029 A | 10/2008 |
| KR | 10-2012-0113664 A | 10/2012 |

OTHER PUBLICATIONS

Written Opinion of International Searching Authority dated Aug. 25, 2014 in connection with International Patent Application No. PCT/KR2014/004506, 5 pages.
Extended European Search Report dated Feb. 26, 2016 in connection with European Application No. 14801708.0, 11 pages.
Intel, "Key Issues for WLAN_NDS", 3GPP TSG SA WG2 Meeting #91, TD S2-122190 May 21-25, 2012, Kyoto, Japan, 2 pages.
LG Electronics, "Clarification on the Scope of ISRP Filter Rule Priority", 3GPP TSG-SA2 Meeting #88, S2-115168, San Francisco, California, Nov. 14-18, 2011, 4 pages.
Nokia Siemens Networks, et al., "Solution How to Consider Load Information During WLAN Network Selection", SA WG2 Meeting $96, S2-131152, San Diegbo, California, Apr. 8-12, 2013, 3 pages.
Communication from a foreign patent office in a counterpart foreign application, European Patent Office, "Communication pursuant to Article 94(3) EPC," Application No. EP 14801708.0, dated Feb. 7, 2018, 7 pages.
3GPP TR 23.865 V0.5.0 (Feb. 2013), Technical Report, 3rd Generation Partnership Project; Technical Specification Group Services and System Aspects; WLAN Network Selection for 3GPP Terminals; Stage 2 (Release 12), 30 pages.
Communication from a foreign patent office in a counterpart foreign application, State Intellectual Property Office of the People's Republic of China, "The First Office Action," Application No. CN 201480020366.3, dated Jul. 4, 2018, 21 pages.
European Patent Office, "European Search Report," Application No. EP 19163761.0, dated Jul. 22, 2019, 9 pages.
3GPP TR 23.865 V0.6.0 (Apr. 2013), Technical Report, 3rd Generation Partnership Project; Technical Specification Group Services and System Aspects; WLAN Network Selection for 3GPP Terminals; Stage 2 (Release 12), 33 pages.
Office Action dated Nov. 18, 2019 in connection with India Patent Application No. 3093/KOLNP/2015, 6 pages.
Korean Intellectual Property Office, Office Action regarding Application No. 10-2014-0060610, dated Apr. 29, 2020, 10 pages.

METHOD AND APPARATUS FOR EFFECTIVE WIRELESS LAN SELECTION

CROSS-REFERENCE TO RELATED APPLICATIONS

This application is a continuation of U.S. patent application Ser. No. 14/782,782, filed Oct. 6, 2015, which is a 371 National Stage of International Application No. PCT/KR2014/004506, filed May 20, 2014, which claims priority to Korean Patent Application No. 10-2013-0056419, filed May 20, 2013, and Korean Patent Application No. 10-2013-0132317, filed Nov. 1, 2013, the disclosures of which are herein incorporated by reference in their entirety. U.S. Pat. No. 10,122,633 issued Nov. 6, 2018 is also a continuation of U.S. patent application Ser. No. 14/782,782.

BACKGROUND

1. Field

An embodiment of the present specification relates to a method and apparatus for off-loading traffic in consideration of congestion in a wireless communication system. In more detail, an embodiment of the present specification relates to a method and apparatus capable of off-loading traffic by selecting an Access Network (AN) most suitable for a User Equipment (UE) in consideration of state information of the AN in a wireless communication system including a heterogeneous network.

2. Description of Related Art

In general, a mobile communication system has been developed to provide a voice service while guaranteeing activity of a user. However, the mobile communication system has gradually extended its field to the data providing service beyond the voice providing service and has now developed to such a level at which the mobile communication system can provide a high speed data service. However, since resources are lacking and users demand higher speed services in the mobile communication system currently providing a service, a more improved mobile communication system is needed.

To meet the demand, standardization of Long Term Evolution (LTE) is being progressed by the 3$^{rd}$ Generation Partnership Project (3GPP) as one of the next generation mobile communication systems that are being developed. The LTE is a technology of implementing high speed packet based communication with a transmission rate of up to about 100 Mbps. To this end, several methods are being discussed, including a method of reducing the number of nodes located on a communication channel by simplifying a network architecture, a method of making wireless protocols closely access a wireless channel to the maximum, and the like.

In such a mobile communication system, a UE can simultaneously use a plurality of heterogeneous networks. In this case, which kind of mobile communication system is used by a user to transmit specific traffic is determined by a predetermined policy.

An operator can provide a wireless access service to users through various network configurations. For example, an operator can install a 3G/4G access network, additionally install a non-3GPP access network in an area where there are a large number of users, and rent a non-3GPP network in a partial area by concluding an agreement with another operator.

FIG. 1 illustrates an example of a network according to the related art.

Referring to FIG. 1, an operator Access Point (AP) 120 which is directly installed by an operator and a partner AP 130 which is installed by a partner who concludes an agreement with the operator may be located within an LTE coverage 110. At this time, costs actually required for providing a service to a user may be varied according to each access network. For example, costs of a 3G/4G service including an LTE network are most expensive due to 3G/4G frequency costs, costs of a non-3GPP network including the partner AP 130, rented from another operator, are second most expensive due to a rental expense, and costs of a non-3GPP network including the operator AP 120, installed directly by the operator itself, are cheapest. Thus, the operator should be able to control a use rate by differentially applying a priority according to each access network when selecting an access network to be used by users.

SUMMARY

Technical Problem

The present invention has been conceived to solve the above-described problem, and an aspect of the present invention is to prevent a situation in which a process of reselecting an unnecessary access network occurs frequently or access to an access network having a low priority is unnecessarily maintained for a long time, when various access networks have different access priorities in a wireless communication system including a heterogeneous network.

Solution to Problem

In order to achieve the above-described aspects, in accordance with an embodiment of the present specification, a method of selecting an access network in a UE of a mobile communication system is provided. The method includes: when traffic is generated in the UE, selecting an access network according to a characteristic of the generated traffic and network selection policy information; and transmitting/receiving the generated traffic to/from the selected access network.

In accordance with another embodiment of the present specification, a UE for selecting an access network in a mobile communication system is provided. The UE includes: a transmission/reception unit that transmits/receives a signal to/from a network entity including an eNB and a wireless access point; and a controller that controls the transmission/reception unit, selects an access network according to a characteristic of generated traffic and network selection policy information when the traffic is generated, and controls the UE to transmit/receive the generated traffic through the selected access network.

In accordance with another embodiment of the present specification, a network entity apparatus including an eNB or a Wireless Local Area Network (WLAN) Access Point (AP) in a mobile communication system is provided. The network entity apparatus includes: a transmission/reception unit that transmits/receives a signal to/from a UE; and a controller that controls the transmission/reception unit, and controls the network entity apparatus to, when traffic is generated in the UE, transmit/receive data corresponding to the generated traffic, wherein the network entity is selected according to a characteristic of the traffic and network selection policy information.

In accordance with yet another embodiment of the present specification, a method of transmitting/receiving a signal to/from a network entity including an eNB and a WLANAP in a mobile communication system is provided. The method includes: transmitting/receiving a signal to/from a UE; and when traffic is generated in the UE, transmitting/receiving data corresponding to the generated traffic, wherein the network entity is selected according to a characteristic of the traffic and network selection policy information.

Advantageous Effects of Invention

According to an embodiment, in a wireless communication system including a heterogeneous network, an access priority for each user and each application is adjusted, so that the number of times of reselecting an access network of a UE is reduced and a probability that a UE unnecessarily accesses a network having a low priority or high costs for a long time is reduced. Thus, a user convenience is improved and a communication efficiency is improved.

DETAILED DESCRIPTION

Figure 1:
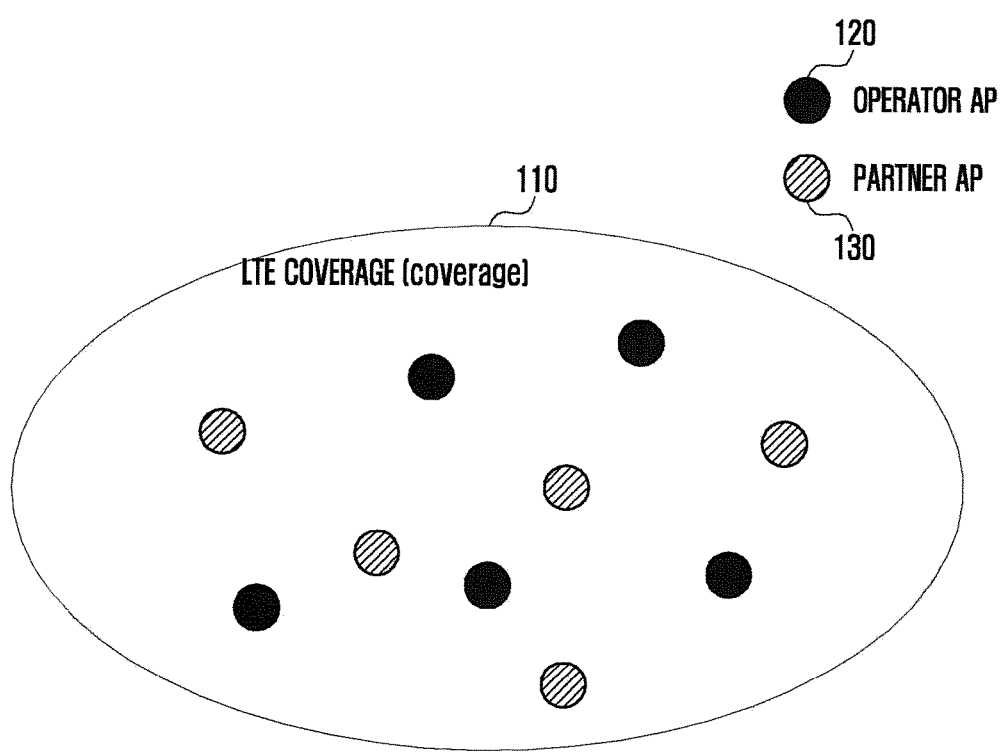
FIG. 1 illustrates an example of a network according to the related art.

Hereinafter, an embodiment of the present invention will be described in detail with reference to the accompanying drawings. In describing the exemplary embodiments of the present invention, descriptions related to technical contents which are well-known in the art to which the present invention pertains, and are not directly associated with the present invention, will be omitted. Such an omission of unnecessary descriptions is intended to prevent obscuring of the main idea of the present invention and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Communication entities of the overall embodiments may include a transmission/reception unit for transmitting/receiving a signal to/from another communication entity, a storage unit for storing transmitted/received information in the communication entity, and a controller for controlling the transmission/reception unit and an operation of the communication entity.

In the following description of embodiments of the present invention, a detailed description of known functions or configurations incorporated herein will be omitted when it is determined that the detailed description thereof may unnecessarily obscure the subject matter of the present invention.

Further, in the detailed description of embodiments of the present specification, a main target to be described is a basic 3rd Generation Partnership Project (3GPP) Long Term Evolution (LTE) system and a terminal. However, embodiments of the present invention can be also applied to other communication/computer systems having a similar technical field and a similar system form without greatly departing from the scope of the embodiments of the present specification, and this application can be performed on the basis of the determination of those skilled in the art.

In particular, in an embodiment of the present specification, a congestion state is used as a concept including both a state of traffic being transmitted in an access network and a state of a valid resource (maximum transmission rate) which can be used in the access network. That is, in embodiments of the present specification, the fact that an access network is busy may correspond to one or more of a case where an amount of traffic being transmitted is large or a case where an amount of valid resources is low.

In contrast, in embodiments of the present specification, the fact that a congestion degree of an access network is low corresponds to one or more of a case where an amount of traffic is low and a case where a UE can obtain a high transmission rate due to a sufficient amount of valid resources.

Further, in an embodiment of the present specification, a congestion state may be expressed in a form of an off-loading preference degree of one access network (i.e. a degree to which a UE using an access network is off-loaded to another access network according to a congestion state of the access network).

Figure 2:
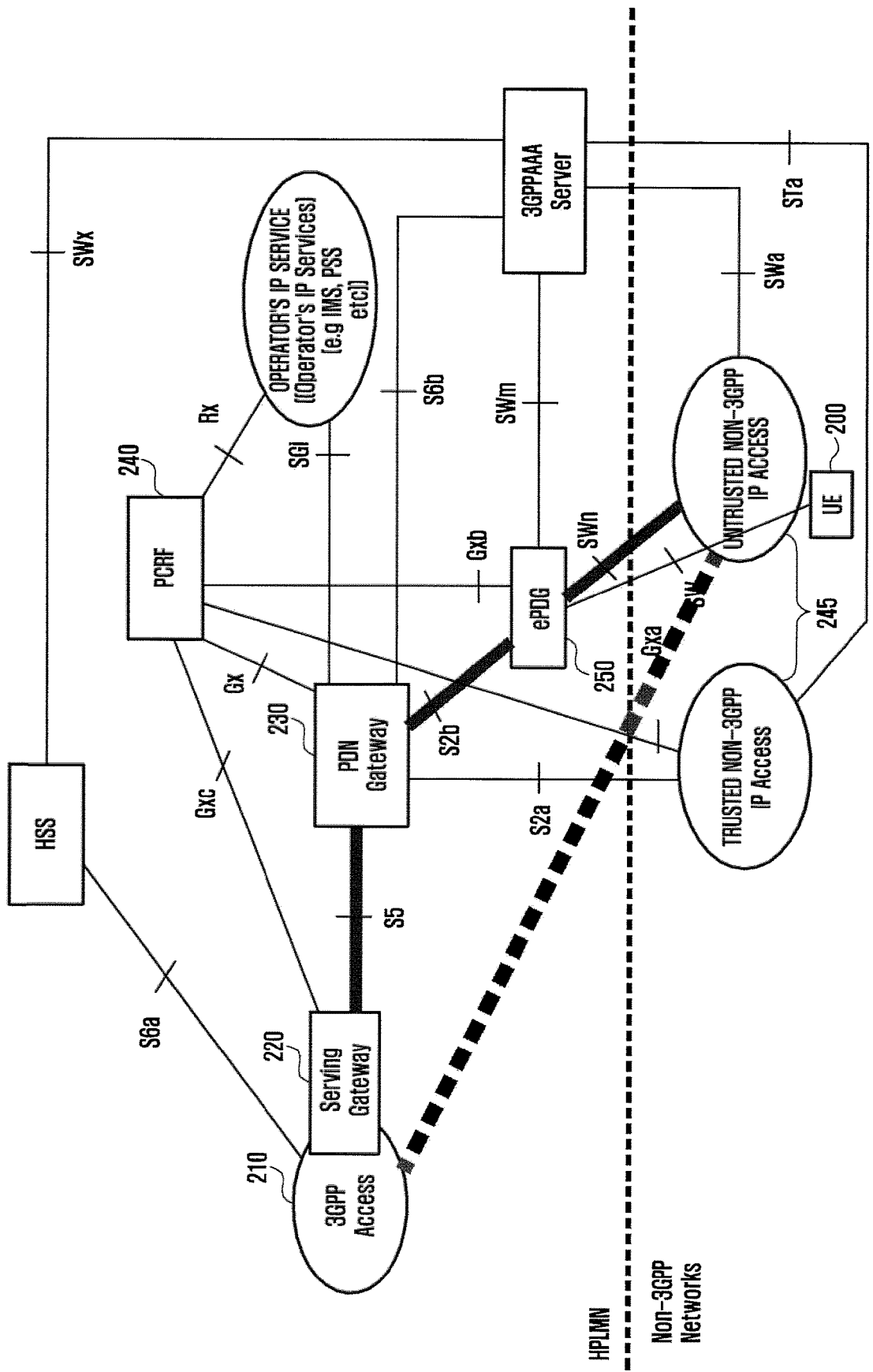
FIG. 2 illustrates an example where a heterogeneous network is used in a mobile communication system.

FIG. 2 illustrates an example where a heterogeneous network is used in a mobile communication system.

Referring to FIG. 2, as illustrated, a wireless access network of the LTE mobile communication system includes a next-generation base station (Evolved Node B or EUTRAN; hereinafter, referred to as an eNB or a Node B), a Mobility Management Entity (MME) and a Serving-GateWay (S-GW) 220. A User Equipment (hereinafter, referred to as a UE) 200 accesses an external network through the eNB, the S-GW 220, and a PDN-GateWay (P-GW) 230.

The eNB corresponds to an existing node B of a Universal Mobile Telephone System (UMTS). The eNB is connected with the UE 200 through a wireless channel, and performs a more complicated role than the conventional node B. It is assumed in FIG. 2 that the eNB is included in a block of a 3GPP Access 210.

In the LTE system, since all user traffic including a real time service such as a Voice over IP (VoIP) through an Internet Protocol (IP) is serviced through a shared channel, an apparatus for collecting and scheduling status information of UEs is required, and the eNB serves as the corresponding apparatus.

The S-GW 220 is an apparatus for providing a data bearer, and can generate or remove a data bearer under a control of the MME.

The MME is an apparatus which is in charge of various control functions, and one MME can be connected to a plurality of eNBs.

A PCRF 240 is an apparatus for controlling a policy related to a Quality of Service (QoS) and billing.

As illustrated in the drawing, the mobile communication system may perform accessing by using a Non-3GPP access network 245 such as a Wi-Fi, WiMAX and CDMA2000 (mentioned as an Evolved Packet Data Gateway or referred to as a second wireless network, hereinafter both are mixedly used) as well as a 3GPP access network such as LTE (or referred to as a first wireless network, hereinafter both are mixedly used).

A user can transmit/receive data by accessing the PGW 230 through the Non-3GPP AN 245. In this case, a node called a separate ePDG 250 may be used for security or QoS mapping. Further, in this case, the Non-3GPP AN may be called an Untrusted Non-3GPP AN. The ePDG 250 can perform authentication between the UE and the ePDG 250 and generate a tunnel, in order to make an untrusted access network having a security problem trusted. Further, the UE, which trusts the access network through the above operation, may be connected to the P-GW 230 via the ePDG 250.

Meanwhile, when the UE can use the 3GPP AN and the Non-3GPP AN in order to transmit/receive data while accessing the mobile communication system, there should be standard for AN selection. The standard therefor is called an access network selection policy (hereinafter, referred to as a policy), and the policy may be predetermined in the UE or may be provided from a separate server such as an Access Network Discovery Service Function (ANDSF) to the UE. The ANDSF can provide a technology relating to a handover between heterogeneous models. The ANDSF collects and stores information on each network and policy information of an operator in advance, and then provide the collected information to the UE when receiving a request from the UE. In the description of embodiments of the present specification, for the convenience of the description, the fact that the ANDSF generates a policy and transmits the generated policy to the UE, and then the UE selects a network between heterogeneous networks on the basis of the policy received from the ANDSF has been described as a standard. However, the subject matter of the present specification can be applied to a case where the policy is predetermined in the UE or a case where similar kinds of policies are transmitted from a server to the UE.

Figure 3:
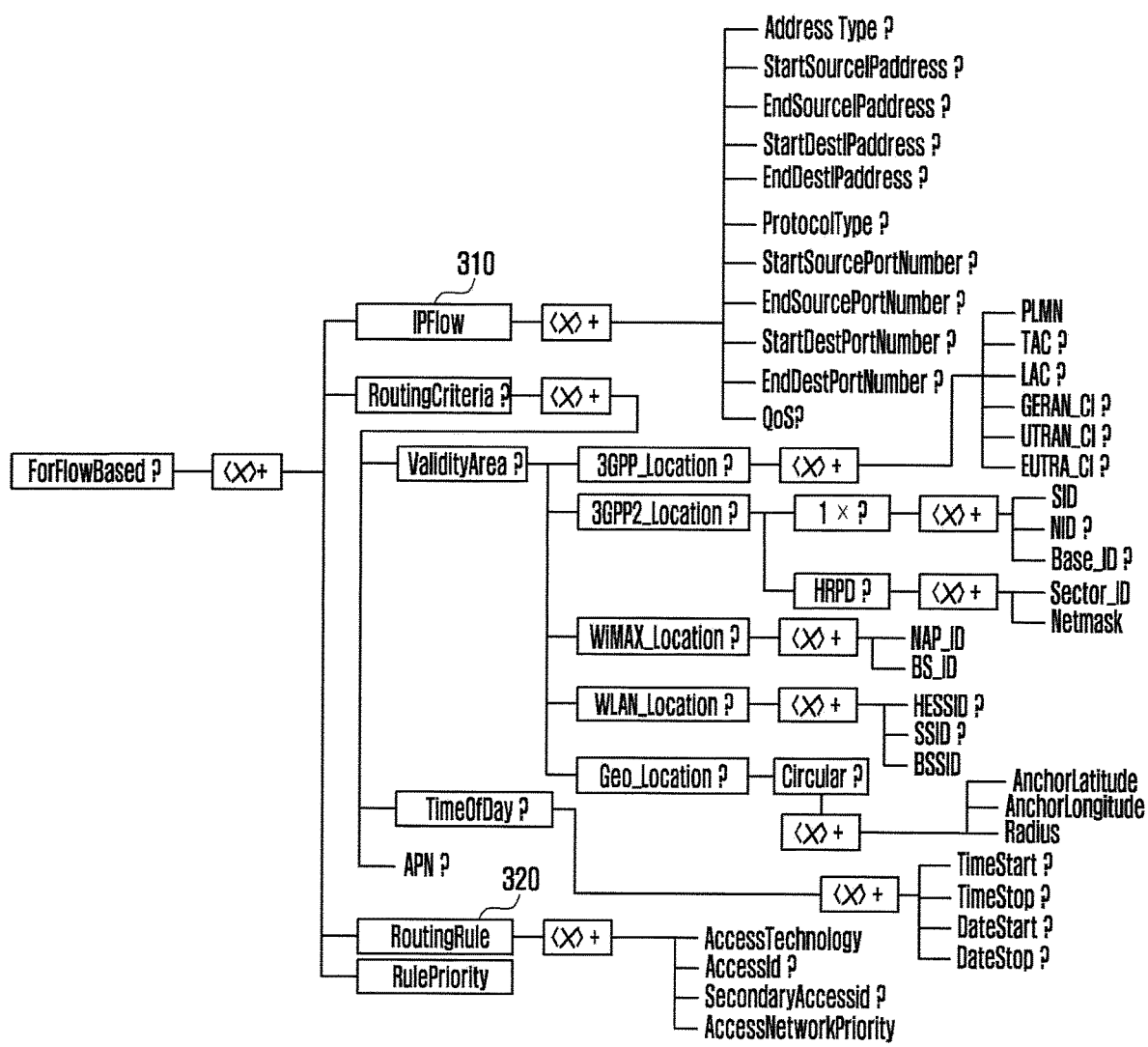
FIG. 3 illustrates "ForFlowBased" which is one kind of a flow distribution container belonging to one policy (Inter-System Routing Policy; ISRP) of an ANDSF.

FIG. 3 illustrates "ForFlowBased" which is one kind of a flow distribution container belonging to one policy (Inter-System Routing Policy; ISRP) of an ANDSF. Referring to FIG. 3, in the overall description of an embodiment, a field for detecting a characteristic of traffic (e.g. information used to determine whether traffic corresponding to an "IPFlow" is matched) is called a flow descriptor. Further, a value determined on the basis of an operation of the existing ANDSF may be used as "ForFlowBased" of FIG. 3.

In an embodiment, an "IPFlow" 310 may include one or more field values indicating characteristics of traffic.

In an embodiment, a "RoutingRule" 320 may include one or more field values for determining routing. In the description of embodiments of the present invention, for the convenience and briefness of the description, a specific flow distribution container (e.g. "ForFlowBased") belonging to a specific policy (e.g. an ISRP) of the ANDSF is standard. However, the subject matter of the present invention may be applied to another policy of the ANDSF (e.g. Inter-System Mobility Policy (ISMP)) or other flow distribution containers (e.g. "ForNonSeamlessOffloading").

First Embodiment

A first embodiment of the present specification includes a method of selecting an access network using a "RulePriority". When a policy relating to traffic offloading (i.e. a set of rules for which access network is used from among a plurality of access networks) is configured in a UE, flow distribution rules (hereinafter, referred to as a rule) belonging to the policy may have a rule priority which is a relative priority to each rule. In an embodiment, the UE can determine an access network with reference to the Rule priority according to a type of traffic.

The UE can select an access network according to a "RoutingRule" of a rule having the highest rule priority from among the valid flow distribution rule.

Figure 4:
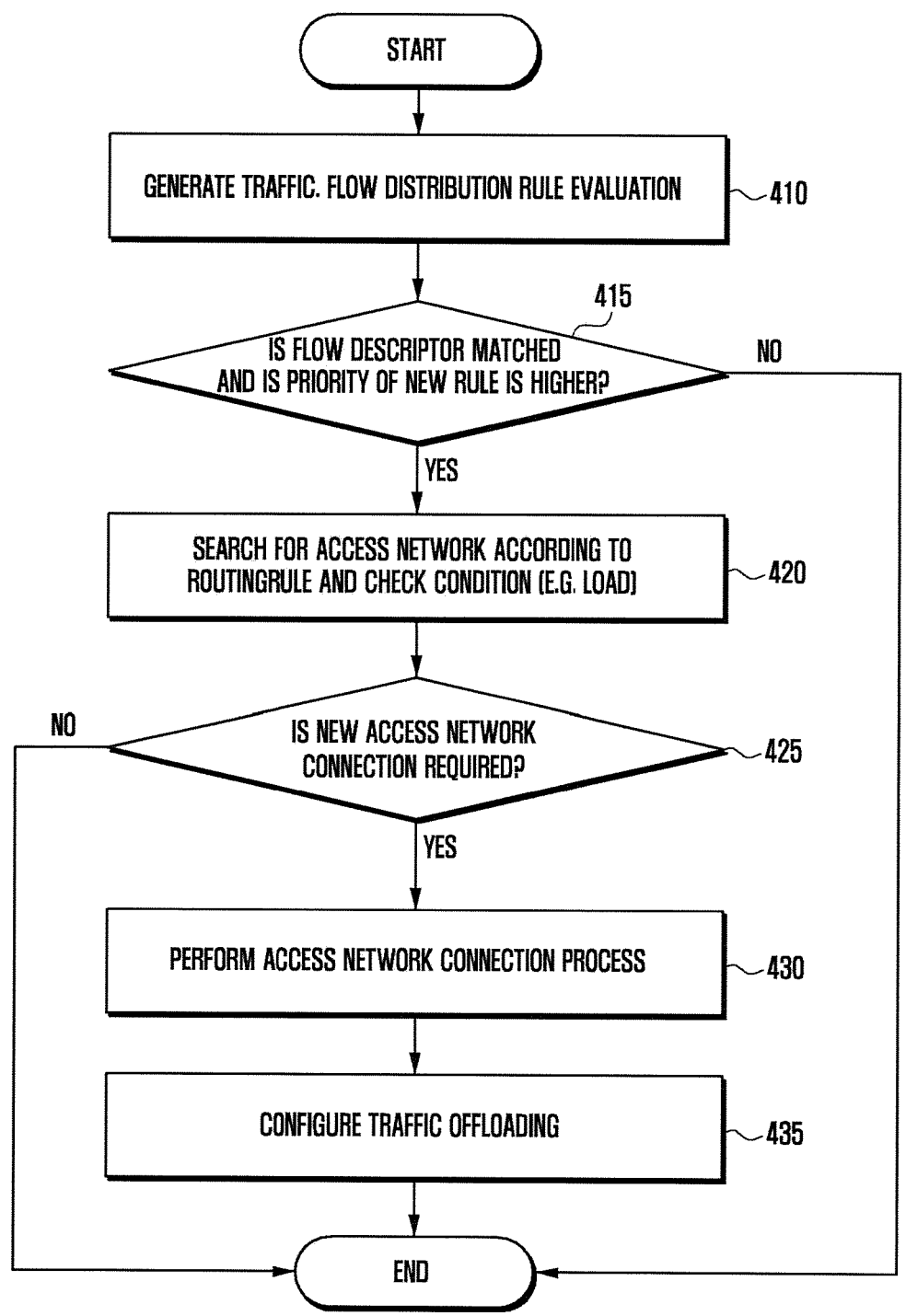
FIG. 4 is a flowchart illustrating an operation of a UE according to a first embodiment of the present specification.

FIG. 4 is a flowchart illustrating an operation of a UE according to a first embodiment of the present specification.

Referring to FIG. 4, the UE has flow distribution rules having a relative "RulePriority".

In step 410, a new data flow (traffic) may be generated in the UE. The UE can compare a flow descriptor of valid flow distribution rules with characteristics of the traffic.

In step 415, when there is a coincident rule, if there are a "RulePriority" of the corresponding rule and a "RulePriority" of a rule used to select the existing access network, the UE can compare the two values with each other.

When a "RulePriority" of the existing rule is higher than a "RulePriority" of a new rule, the UE can transmit/receive data through the previously connected access network.

When there is no existing rule used for selecting an access network or a "RulePriority" of a rule matched with new traffic is higher than that of the existing rule, the UE can search for an access network according to an access network selection rule (e.g. "RoutingRule") of the rule, and when there is a condition (e.g. a load state condition such as BSS load or WAN metric, a condition such as a venue, a signal intensity condition, a prediction processing amount condition, or a condition such as an affiliation or an identifier of the WLAN, e.g. SSID/Service operator/OUI/Realm/Roaming Consortium), the UE can select an access network having the highest "AccessNetworkPriority" from among access networks, the conditions of which are satisfied, in step 420.

In step 425, the UE can determine whether a connection to a new access network is required, according to one or more of results of the searching and the selecting in step 420. Further, the process of step 425 may include selecting an access network through which traffic is to be transmitted/received according to a determination result of the UE.

When it has been determined that the connection to a new access network is not required, data can be transmitted/received through the previously connected access network.

When it has been determined in step 425 that an access network different from the previously configured access network should be selected, the UE may perform a connection to the new access network, in step 430, and the UE may perform a transmission configuration for traffic including traffic offloading, in step 435.

In order to describe the first embodiment in more detail, it can be assumed that the UE has the following two flow distribution rules.

Rule #1={IP flow="abc.comabc.com", RoutingRule= (WLAN, SSID A, venue=home, channel utilization<50), RulePriority=1}

Rule #2={IP flow="xyz.comxyz.com", RoutingRule= {(WLAN, SSID B, DL WAN speed>10 Mbps, AccessNetworkPriority=1), (WLAN, SSID A, AccessNetworkPriority=2)}, RulePriority=2}

The first flow distribution rule (Rule #1) indicates that, for traffic of "abc.comabc.com", a WLAN having an SSID of A is preferred, and at this time, a selection condition of the WLAN corresponds to a case where a venue is home and a congestion state of the WLAN (channel utilization in BSS load) is equal to or lower than 50. A priority of the first rule is 1.

The second flow distribution rule (Rule #2) indicates that, for traffic of "xyz.comxyz.com", a WLAN having an SSID of B is most preferred, and at this time, a selectin condition of the WLAN corresponds to a case where a state of the WLAN (DL WAN speed in WAN metrics) is equal to or larger than 10 Mbps, and the second most preferred access network is the WLAN having an SSID of A. A priority of the second rule is 2.

It is assumed that the two WLANs (SSID A and SSID B) can access an area of the UE and the states of the WLANs satisfy the selection condition configured in Rule #1 and Rule #2. At an initial state, when the UE should transmit/receive the traffic of "xyz.com", the UE selects Rule #2 by the rules, and accordingly, the UE accesses the WLAN having an SSID of B to transmit traffic.

Thereafter, when the UE transmits/receives the traffic of "abc.com", since the priority of Rule #1 is higher than the priority of Rule #2, the UE disconnects an access to the WLAN having an SSID of B to access the WLAN having an SSID of A so as to transmit traffic according to Rule #1.

In this case, the traffic of "xyz.com", which has been transmitted to the WLAN having an SSID of B, may be transmitted to the WLAN having an SSID of A by the "RoutingRule" corresponding to "AccessNetworkPriority=2" of Rule #2.

In this way, the first embodiment is a method of selecting an access network according to the state condition of the access network and a priority between flow distribution rules, and may include a concept that traffic having the highest priority uses the most preferred access network. However, the method by the first embodiment has a limitation that, even when transmission/reception of traffic having the highest priority is terminated, traffic having the second highest traffic may be transmitted through an access network preferred by the traffic having the highest priority. In the above example, when a current WLAN is changed to the WLAN having an SSID of A by the traffic of "abc.com", and transmission/reception of the traffic of "abc.com" is terminated, the traffic of "xyz.com" may be transmitted through the WLAN having an SSID of A even though the WLAN having an SSID of B is more preferred.

Second Embodiment

A method of using an active timer in order to solve the limitation of the first embodiment is proposed in the second embodiment. That is, the above problem corresponds to a case where, even though the traffic having the highest priority is in an inactive state, the inactive state is not recognized, and thus, traffic having the second highest priority is discriminated such that a rule capable of selecting the traffic having the second highest priority is applied. Thus, in the method according to the second embodiment, when a timer is provided for each flow distribution rule and traffic is not transmitted/received during a period of a timer, it can be determined that traffic included in the corresponding rule is in an inactive state. In this way, when it is determined that the traffic having the highest priority is in an inactive state, the UE can allow an access network to be changed according to a rule having the highest priority from among flow distribution rules owned by other active traffic. The active timer may have a predetermined time value, and the time value can be determined by an ANDSF or a UE.

In an embodiment, a timer used to determine whether each flow distribution rule is active may use a value predetermined by the UE or may be transmitted from the ANDSF to the UE as one piece of information while being included in a message transmitted to the UE by the ANDSF.

Figure 5:
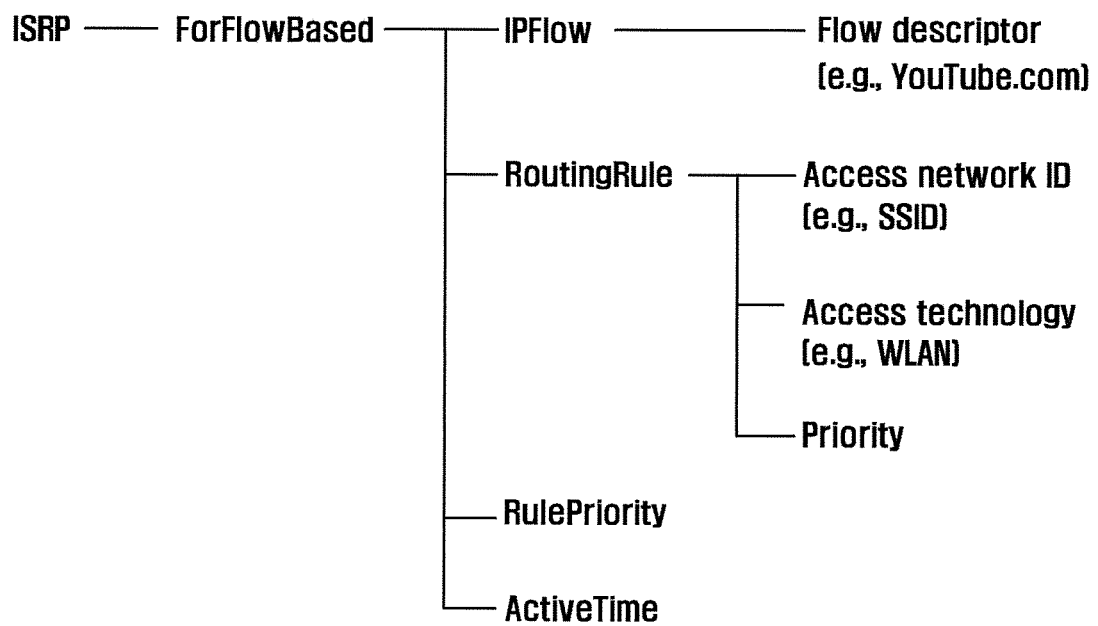
FIG. 5 illustrates a configuration of an ISRP according to an embodiment.

FIG. 5 illustrates a configuration of one policy (ISRP in the present embodiment) according to an embodiment.

Referring to FIG. 5, in an embodiment, the ANDSF can transmit a message including information illustrated in FIG. 5 to the UE. According to an embodiment, the ANDSF can configure a timer value according to each flow distribution rule to transmit to a configured timer value to the UE, and according to an embodiment, the ANDSF can configure a timer value to be equal with respect to each of the entire policies. Further, according to an embodiment, the timer value can be dynamically determined according to the determination of the UE. In an embodiment, the timer may be designated as a field of an ActiveTime. Further, values of other fields can be determined according to an operation of the existing ANDSF.

Figure 6:
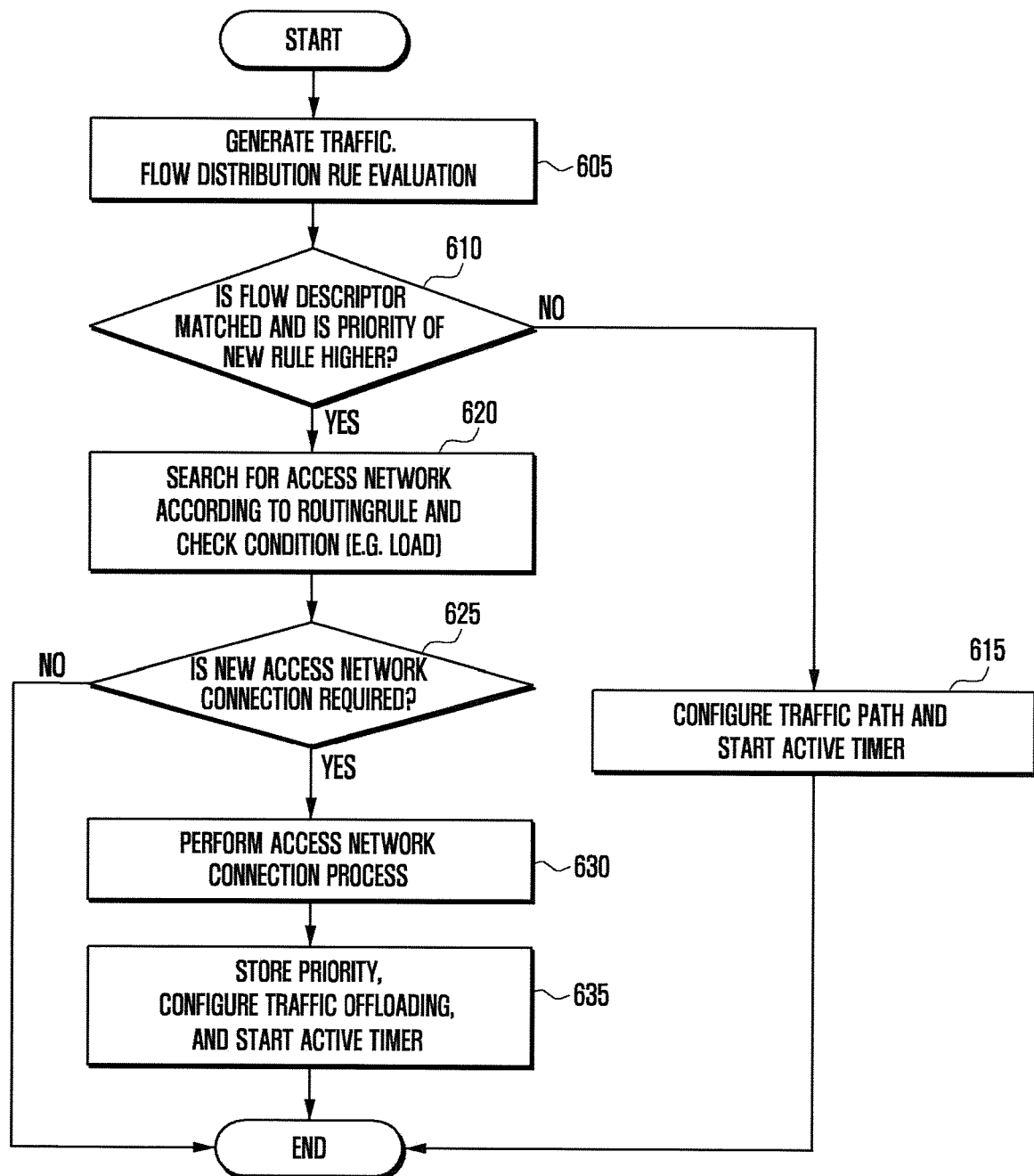
FIG. 6 is a flowchart illustrating an operation of a UE according to a second embodiment of the present specification.

FIG. 6 is a flowchart illustrating an operation of a UE according to a second embodiment of the present specification.

Referring to FIG. 6, the UE has flow distribution rules having a relative RulePriority. Further, according to an embodiment, the flow distribution rule can be separately configured for each traffic.

In step 605, a new data flow (traffic) may be generated in the UE. In an embodiment, the UE can compare a flow descriptor of valid flow distribution rules with characteristics of the traffic.

In step 610, when there is a coincident rule, if there is a "RulePriority" of the corresponding rule and a "RulePriority" of a rule used to select the existing access network, the UE can compare the two values with each other.

When a priority of a flow distribution rule to which a currently generated data flow belongs is not highest, the UE can start or reset an active timer for the flow distribution rule to which the generated data flow belongs, and then perform monitoring.

When there is no existing rule used for selecting an access network or a "RulePriority" of a rule matched with new traffic is higher than that of the existing rule, the UE can search for an access network according to an access network selection rule (e.g. "RoutingRule") of the rule matched with the new traffic, and when there is a condition (e.g. a load state condition such as BSS load or WAN metric, a condition such as a venue, a signal intensity condition, a prediction processing amount condition, or a condition such as Service operator/OUI/Realm/Roaming Consortium), the UE can select an access network having the highest "AccessNetworkPriority" from among access networks, the conditions of which are satisfied, in step 620.

In step 625, the UE can determine whether a connection to a new access network is required, according to one or more of results of the searching and the selecting in step 620.

When it has been determined that the connection to a new access network is not required, data can be transmitted/received through the previously connected access network.

When it has been determined in step 625 that an access network different from the previously configured access network should be selected, the UE can perform a connection to the access network, in step 630.

Further, in step 635, the UE can perform a transmission configuration for traffic including traffic offloading. In addition, the UE stores a priority of the corresponding flow distribution rule and monitors whether traffic coinciding with the flow distribution rule is transmitted, during the active timer. In an embodiment, the UE can start the active timer at a time of starting transmission of traffic, and then reset the active timer whenever data of traffic coinciding with the flow distribution rule which executes the active timer is transmitted/received. Further, the UE can be terminated when there is no traffic during the active timer. In more detail, when there is no corresponding traffic while the executed active timer is expired, the UE can determine that transmission/reception of traffic corresponding to the active timer is terminated, and accordingly can perform an operation of applying a new rule. Further, the above operation will be described below.

In an embodiment, when it is determined that the flow distribution rule (i.e. a flow distribution rule having the highest priority from among flow distribution rules matched with active traffic) is not active any more, the UE can reselect an access network according to the flow distribution rule having the highest priority from among flow distribution rules coinciding with an active data flow. In an embodiment, the UE can determine whether the flow distribution rule is active, on the basis of whether a corresponding active timer is expired.

Figure 7:
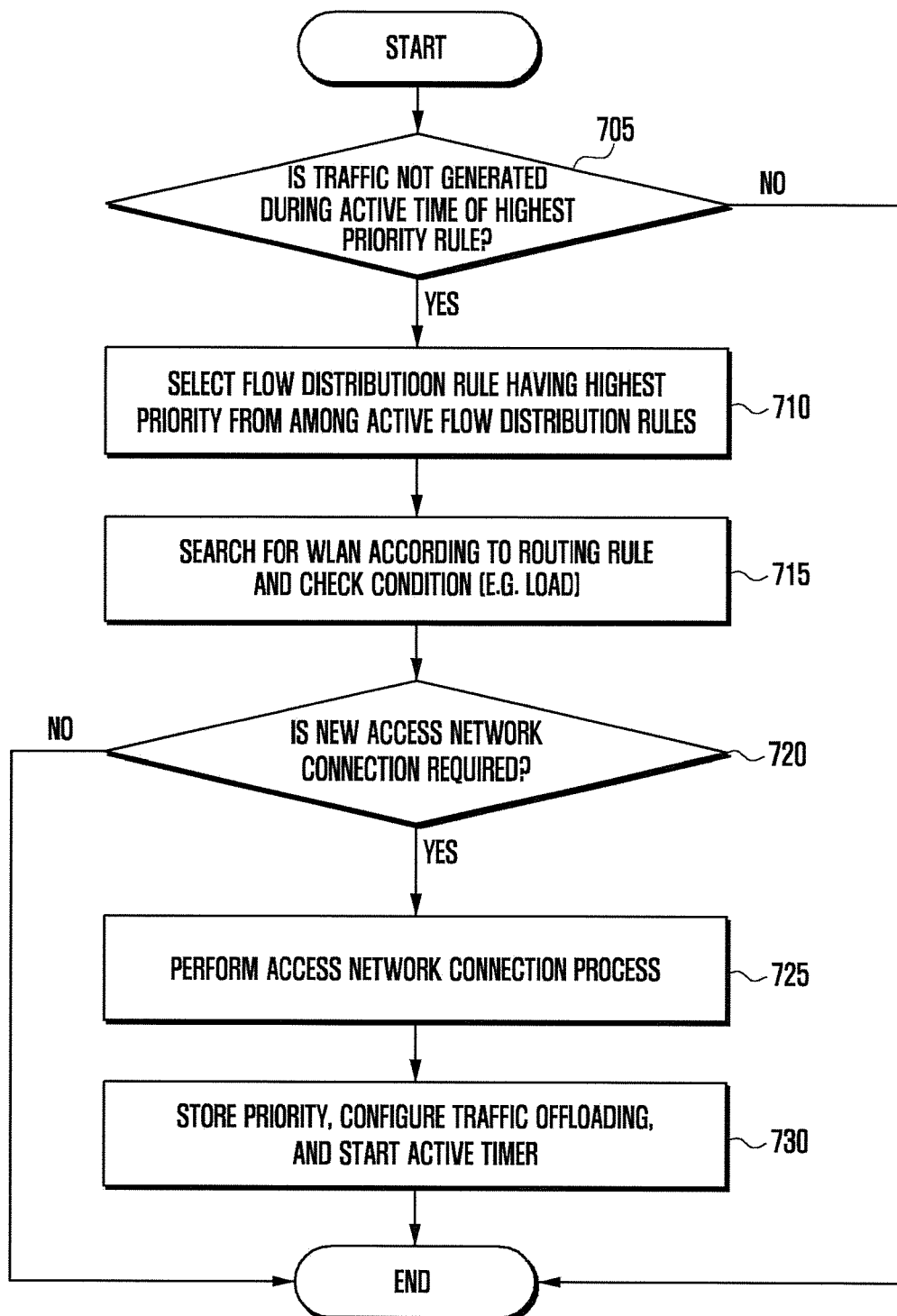
FIG. 7 is a flowchart illustrating an operation of a UE according to a second embodiment of the present specification.

FIG. 7 is a flowchart illustrating an operation of a UE according to a second embodiment of the present specification. Referring to FIG. 7, in step 705, the UE can determine whether traffic corresponding to the highest priority rule is not generated during an active timer. In more detail, the UE can monitor whether a flow distribution rule having the highest priority from among active flow distribution rules is active, through the above monitoring process, and the UE can determine that the flow distribution rule is not active, on the basis of whether the active timer is expired.

When traffic is generated, the UE can perform an operation including traffic transmission/reception.

When it has been determined that traffic is not generated, in step 710, the UE can select a flow distribution rule, which is active and has the second highest priority, from among traffic currently transmitted/received by the UE.

In step 715, the UE can search for an access network according to an access network selection rule (e.g. "RoutingRule") of the selected flow distribution rule, and when there is a condition (e.g. a load state condition such as BSS load or WAN metric, a condition such as a venue, a signal intensity condition, a prediction processing amount condition, or a condition such as an affiliation and an identifier of the WLAN, e.g. SSID/Service operator/OUI/Realm/Roaming Consortium), the UE can select an access network having the highest "AccessNetworkPriority" from among access networks, the conditions of which are satisfied.

In step 720, the UE can determine whether a connection to an access network different from the previously connected access network is required, on the basis of one or more of a result of the searching and a result of the selection.

When the connection to the access network different from the previously connected access network is not required, data can be transmitted/received through the previously connected access network.

When the access network different from the previously configured access network should be selected, the UE can perform a connection to the different access network and a transmission configuration for traffic, in step 725.

In step 730, the UE can store a priority of the flow distribution selected together with the operation of step 725 and monitor whether traffic coinciding with the flow distribution rule is transmitted during an active timer. For this process, after the UE starts the active timer at a time of starting traffic transmission, the UE is reset whenever data of traffic coinciding with the flow distribution rule is transmitted/received, and is then terminated when there is no traffic during the active timer.

Through this operation, the UE can select and use an access network preferred by traffic having the highest priority from among traffic which is always active.

Hereinafter, In order to describe the second embodiment in more detail through an example, it can be assumed that the UE has the following two flow distribution rules.

Rule #1={IP flow="abc.com", RoutingRule=(WLAN, SSID A, venue=home, channel utilization<50), RulePriority=1, active timer=30 sec}

Rule #2={IP flow="xyz.com", RoutingRule={(WLAN, SSID B, DL WAN speed>10 Mbps, AccessNetworkPriority=1), (WLAN, SSID A, AccessNetworkPriority=2)}, RulePriority=2, active timer=20 sec}

The two rules Rule #1 and Rule #2 are obtained by adding active timer values to the two rules described in the first embodiment.

It can be assumed on the basis of the second embodiment that the UE is transmitting traffic of "abc.com" and traffic of "xyz.com" and is using the WLAN having an SSID of A according to a priority. In this situation, when the traffic of "abc.com" is not transmitted during a predetermined time (in the present embodiment, 30 seconds), the UE can determine that the flow distribution rule #1 is not active any longer and can transmit traffic while accessing the WLAN having an SSID of B which is an access network preferred by the traffic of "xyz.com" which is currently active.

Third Embodiment

A third embodiment of the present specification relates to a method of preventing frequency and unnecessary changes in an access network (particularly, the WLAN) as much as possible even while reducing a complexity of the UE.

Conceptually, the third embodiment is based on distinguishing a policy for selecting a WLAN and a policy for offloading traffic. In more detail, the policy for selecting a WLAN and the policy for offloading traffic may be applied while having different priorities.

Further, in an embodiment, the policy for offloading traffic can reuse an ISMP and an ISRP which is transmitted to the UE through the existing ANDSF. The UE may additionally have a "WLANSelectionPolicy" (WLANSP). At this time, the "WLANSelectionPolicy" may be predetermined in the UE or may be configured by being transmitted to the UE through the ANDSF.

The "WLANSelectionPolicy" is a policy used to select a WLAN which the UE is to use. The UE can identify which WLAN is selected under which condition, through this policy. This policy can be configured by a set of various selection rules, which is similar to other ANDSF-based policies. At this time, each rule may have a relative priority, and further, each rule may have a valid condition (condition expressed by Time of day, APN, Vaility Area, other load states, venue, roaming consortium, OUI, etc.). When the valid condition is configured, the UE can determine that the corresponding rule is valid only under a situation in which the condition is satisfied. Further, the selection rule may indicate that a current selection rule is an access form of an applied WLAN, e.g. Non-Seamless WLAN Offloading (NSWO), IFOM, or MAPCON. Further, the selection rule has a list of selectable WLANs, and an item of the list may include affiliations and identifiers of a WLAN (combination of SSID/ESSID/HESSID, OUI, Roaming Consortium, Service Operator ID, Realm, etc.), a selection condition (a venue condition, a load state condition such as BSS load and WAN metric, a signal intensity condition, and a prediction transmission rate condition), a selection priority, etc. When the selection condition is included, one WLAN may be included in a selection candidate only when the selection condition is satisfied.

Figure 11:
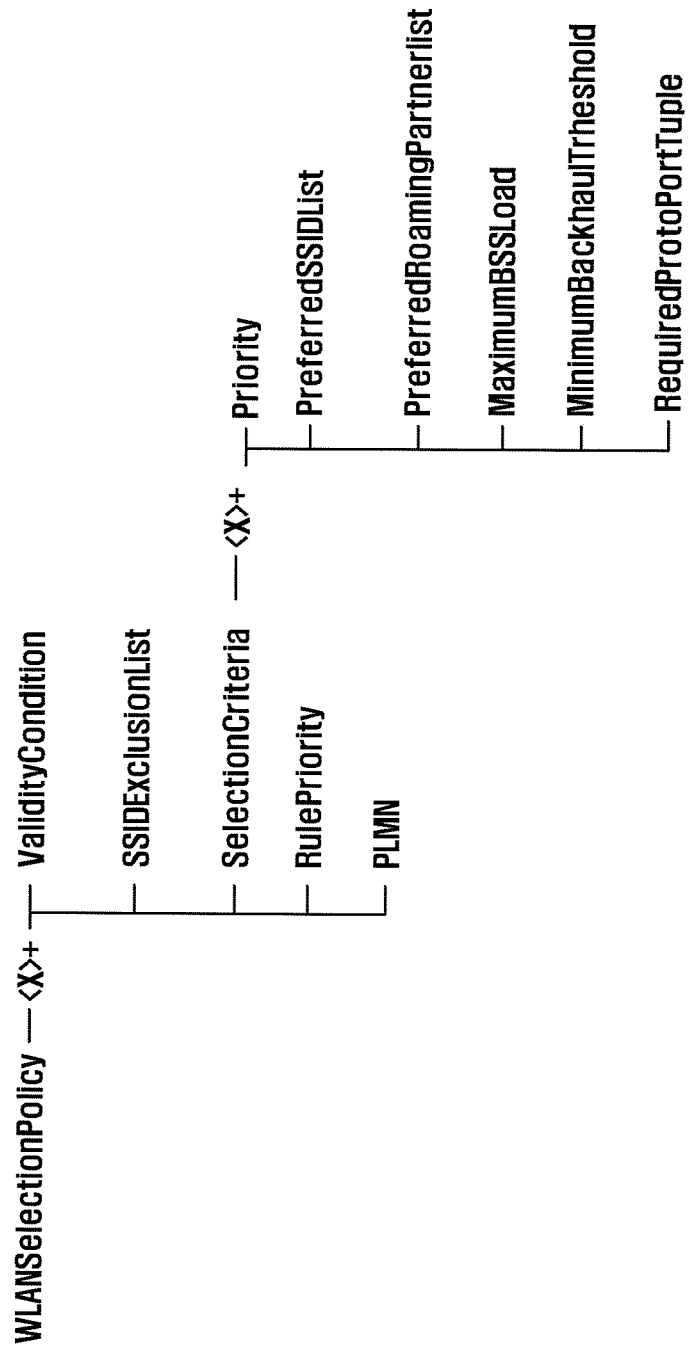
FIG. 11 illustrates a message structure relating to a WLAN selection policy according to an embodiment.

FIG. 11 illustrates a message structure relating to a WLAN selection policy according to an embodiment.

Referring to FIG. 11, one "WLANSelectionPolicy" may have the following form.

In the drawing, "<X>+" indicates that there may be a plurality of sub-trees at a lower part in a tree structure.

In an embodiment, "ValidityCondition" is a condition used when whether one rule is valid is determined, and may include a condition such as a current time, a location of the UE, etc.

"RulePriority" is a value indicating a priority of a rule included in the "WLANSelectionPolicy".

"SSIDExclusionList" includes a list of SSIDs which the UE should not select.

"SelectionCriteria" includes a criterion used when a WLAN is selected according to one rule of the "WLANSelectionPolicy". "Priority" indicating a priority of the "SelectionCriteria" is included therein, a selection criterion may include one or more of a list of preferred SSIDs, a list of preferred roaming partners, the maximum threshold of a degree of congestion of a selectable WLAN, the minimum threshold of a backhaul capacity of the selectable WLAN, and a condition for an IP address and a port to which the WLAN provides a connection. The "SelectionCriteria" may include one or more of pieces of the information, and when two or more conditions are included and all conditions are satisfied, the WLAN can be selected.

Although it is exemplified in the drawing that "SSIDExclusionList" is configured outside the "SelectionCriteria", the "SSIDExclusionList" is included within the "SelectionCriteria". Further, the "SSIDExclusionList" may be replaced with "SPExclusionList" indicating a list of service operators which should not be selected by the UE.

Figure 8:
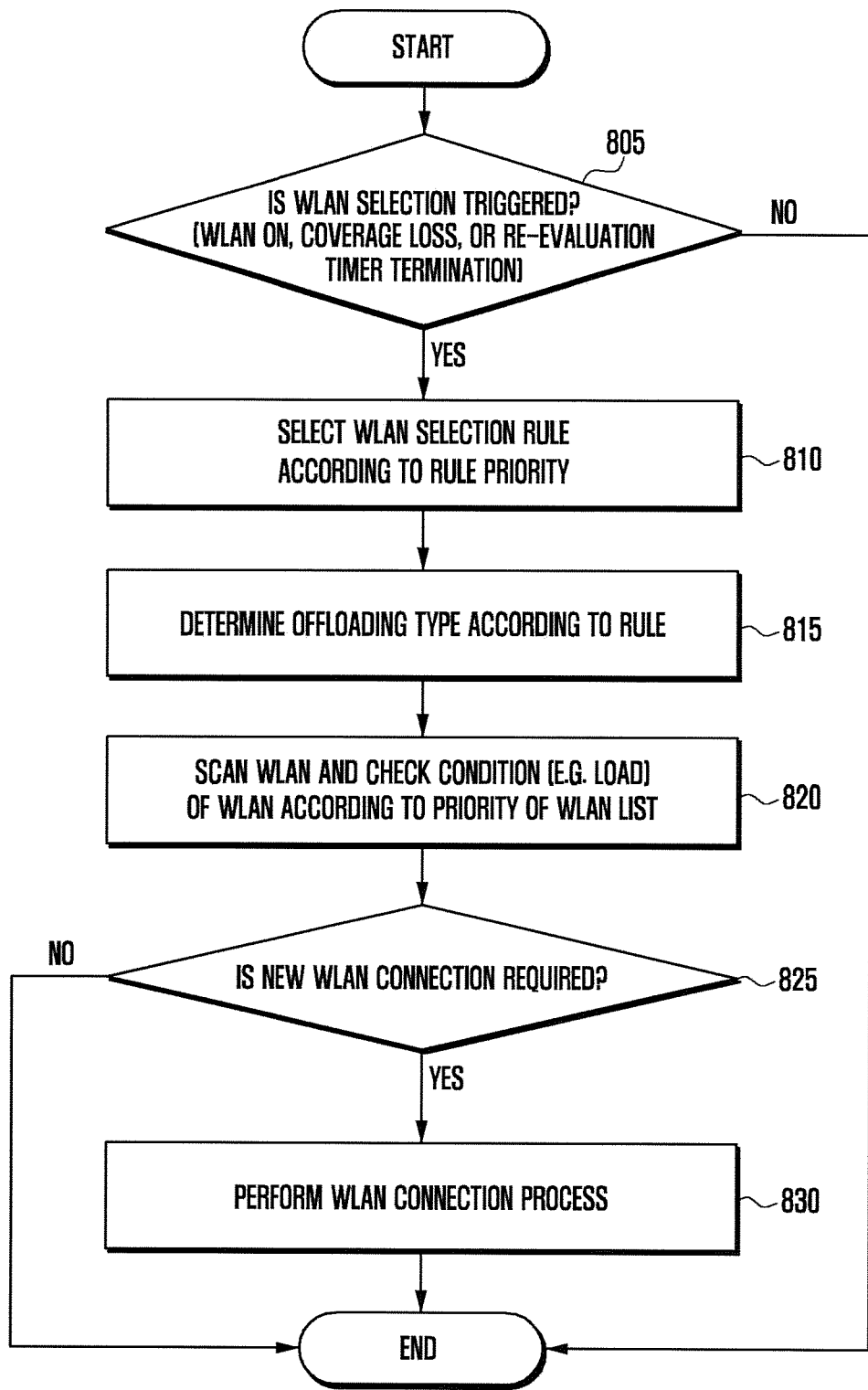
FIG. 8 is a flowchart illustrating an operation of selecting a WLAN according to a third embodiment of the present specification.

FIG. 8 is a flowchart illustrating an operation of selecting a WLAN according to a third embodiment of the present specification.

Referring to FIG. 8, in step 805, the UE can check whether a WLAN selection/reselection condition is satisfied. An operation of the present embodiment can be performed when the UE is a UE having a qualification according to 3GPP subscription information, e.g. a UE having a valid USIM. Further, an operation of FIG. 8 can be performed when a user preference is not configured in the UE or there is no WLAN preferred by a user. In an embodiment, the UE not having a qualification according to the 3GPP subscription information may not perform an operation of the present embodiment, and when user preference is configured in the UE or there is a WLAN preferred by a user, can select a WLAN according to the corresponding information.

In an embodiment, a condition, in which a WLAN selection/reselection is generated, includes a case where a WLAN is turned on again according to a user's setting or a specific condition, a case where a WLAN deviates from a coverage of the previously connected WLAN, a case where a WLAN is not changed during a re-evaluation timer configured in the UE or configured in the UE by a scheme such as the ANDSF, etc. Further, in the related art, traffic has been transmitted only through the 3GPP access network. However, in an embodiment, a WLAN can be selected using the "WLANSelectionPolicy" even when traffic having a high WLAN transmission priority is detected by ISMP/ISRP and thus, the traffic is required to be transmitted through the WLAN.

When it is determined that the WLAN selection/reselection is not required, the UE can transmit/receive data through the previously selected WLAN.

When it is determined that the WLAN selection/reselection is required, the UE can select a rule having the highest priority from among valid WLAN selection rules and, when access type information (NSMO, IFOM/MAPON, etc.) of the selected rule is included, can determine an access type on the basis of the information, in step 810. Here, the access type may include "S2a connectivity".

When the access type is configured, the UE can determine an offloading type on the basis of the selected rule. Here, the offloading type may include "S2a connectivity".

In step 820, when information on a surrounding WLAN is collected, WLAN affiliation/identifier from among a WLAN list included in the rule is matched, and there is a selection condition, the UE can select a WLAN having the highest priority from among WLANs of which the selection condition is satisfied. The UE can receive information broadcasted by the WLAN in an information collection process for determining whether the selection condition is satisfied or can perform an Access Network Query Protocol (ANQP) process. When it is configured that the UE gives a priority to the "S2a connectivity" while the UE performs processes, the UE can preferentially select a WLAN supporting an S2a connection. When the WLAN supporting the S2a connection cannot be selected, the WLAN can be selected with considering whether the S2a connection is supported. Further, when two or more WLANs having the same priority can be selected, the UE can select a WLAN belonging to the most preferred service operator. The most preferred service operator may be preconfigured in the UE or may be determined on the basis of information received by the UE in one of embodiments of the present specification.

In step 825, the UE can determine whether a connection of a new WLAN is required according to the selected WLAN, and when the selected WLAN is a WLAN which is not connected yet, a connection process is performed and traffic offloading is configured, in step 830. In such a process, a part of the process may be omitted according to a change in a policy configuration or implementation for the UE.

In step 815, when the WLAN is selected, the UE can determine whether to transmit traffic to the selected WLAN or the 3GPP access network, by applying a traffic offloading policy (ISRP/ISMP) which is preconfigured or received from the ANDSF. In an embodiment, when a WLAN offloading type is determined in the WLAN selection process, the UE can make a limitation such that the traffic offloading is determined with regard to a matched WLAN offloading type. For example, when the offloading type is configured to be NSWO in the WLAN selection process, the UE may use only "ForNonSeamlessOffload container" in the ISRP.

Figure 9:
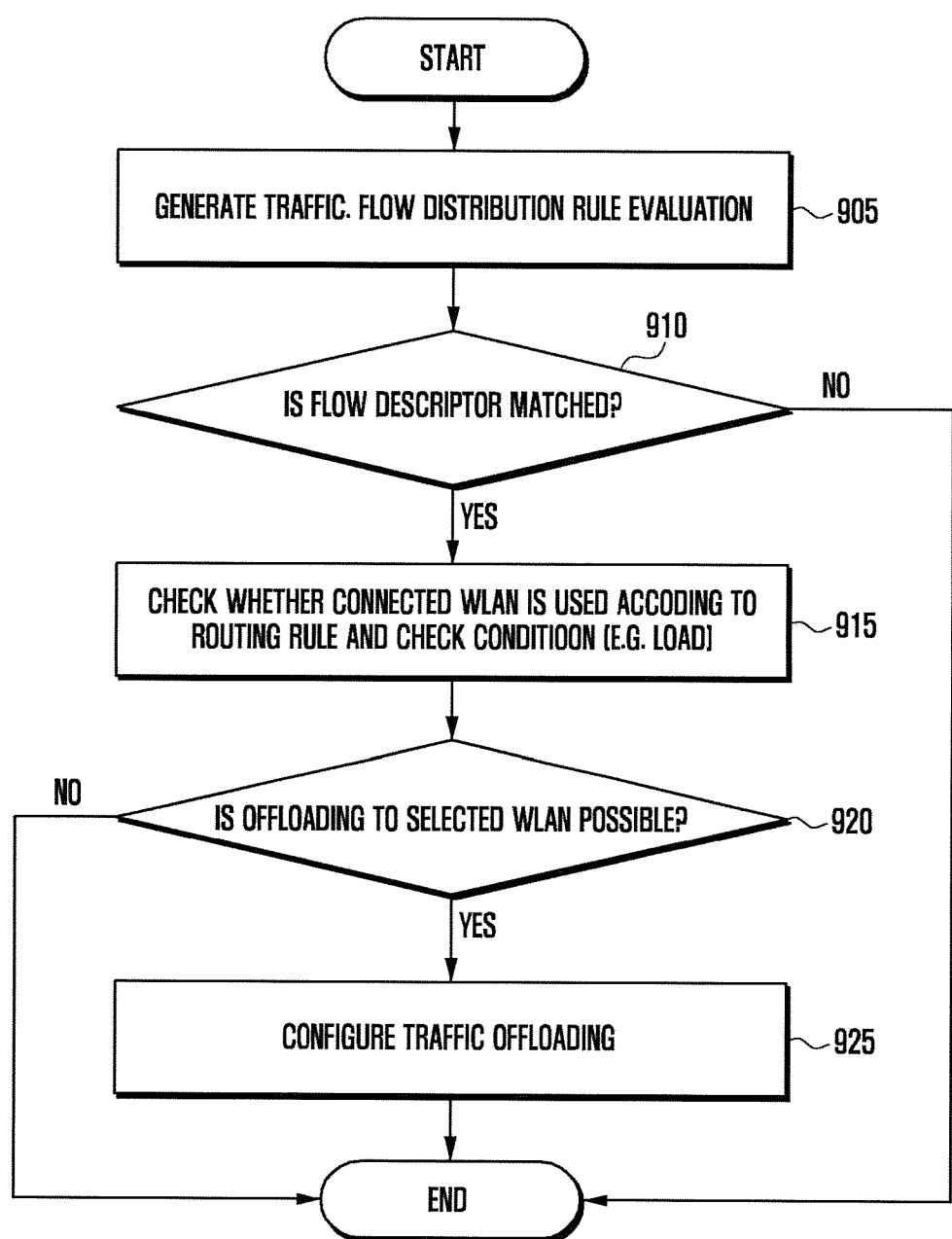
FIG. 9 is a flowchart illustrating a method of determining whether traffic is off-loaded after a WLAN is selected according to an embodiment of the present specification.

FIG. 9 is a flowchart illustrating a method of determining whether traffic is off-loaded after a WLAN is selected according to an embodiment of the present specification.

Referring to FIG. 9, in step 905, when traffic is generated, the UE can examine whether a traffic characteristic coincides with the flow distribution rule of the valid traffic offloading rule (ISRP or ISMP).

In step 910, the UE can examine whether the examination result corresponds to coincidence, on the basis of the examination result.

When the examination result corresponds to coincidence, the UE can select an access network through which the corresponding traffic is transmitted, according to "RoutingRule" of the flow distribution rule, in step 910. In an embodiment, the UE can examine whether a WLAN connected according to the "RoutingRule" is used or not and a condition with regard to use of the WLAN, and the condition may correspond to the condition used in the previous embodiment. Further, the UE can select a WLAN on the basis of one or more of whether the WLAN is used or not and the condition of use of the WLAN.

In step 920, the UE can determine whether offloading to the selected WLAN is possible, and when the offloading is possible, the UE can configure traffic offloading, in step 925.

In a third embodiment, when an access technology by which traffic is transmitted according to a priority is a WLAN and an access network indicated by the "RoutingRule" coincides with the WLAN previously selected through the process, the corresponding traffic can be transmitted through the WLAN. Otherwise, the corresponding traffic is transmitted through another access network of the "RoutingRule" having the second highest priority. At this time, the "RoutingRule" may have a selection condition, for example, a venue condition, a load state condition such as BSS load and WAN metric, a signal intensity condition, a prediction transmission rate condition, etc. When the selection condition is included, if a current state or configuration of the selected WLAN satisfies the selection condition, the UE can determine that traffic can be offloaded. For example, when a WLAN-2 is selected according to an embodiment of the present invention, there is traffic matched with the flow distribution rule, and in the "RoutingRule", a WLAN having an SSID of WLAN-1 has a priority of 1, 3GPP has a priority of 2, and a WLAN having an SSID of WLAN-2 has a priority of 3, the UE can transmit/receive the corresponding traffic through a 3GPP access network, and generate a PDN connection through the 3GPP access network as needed.

Figure 10:
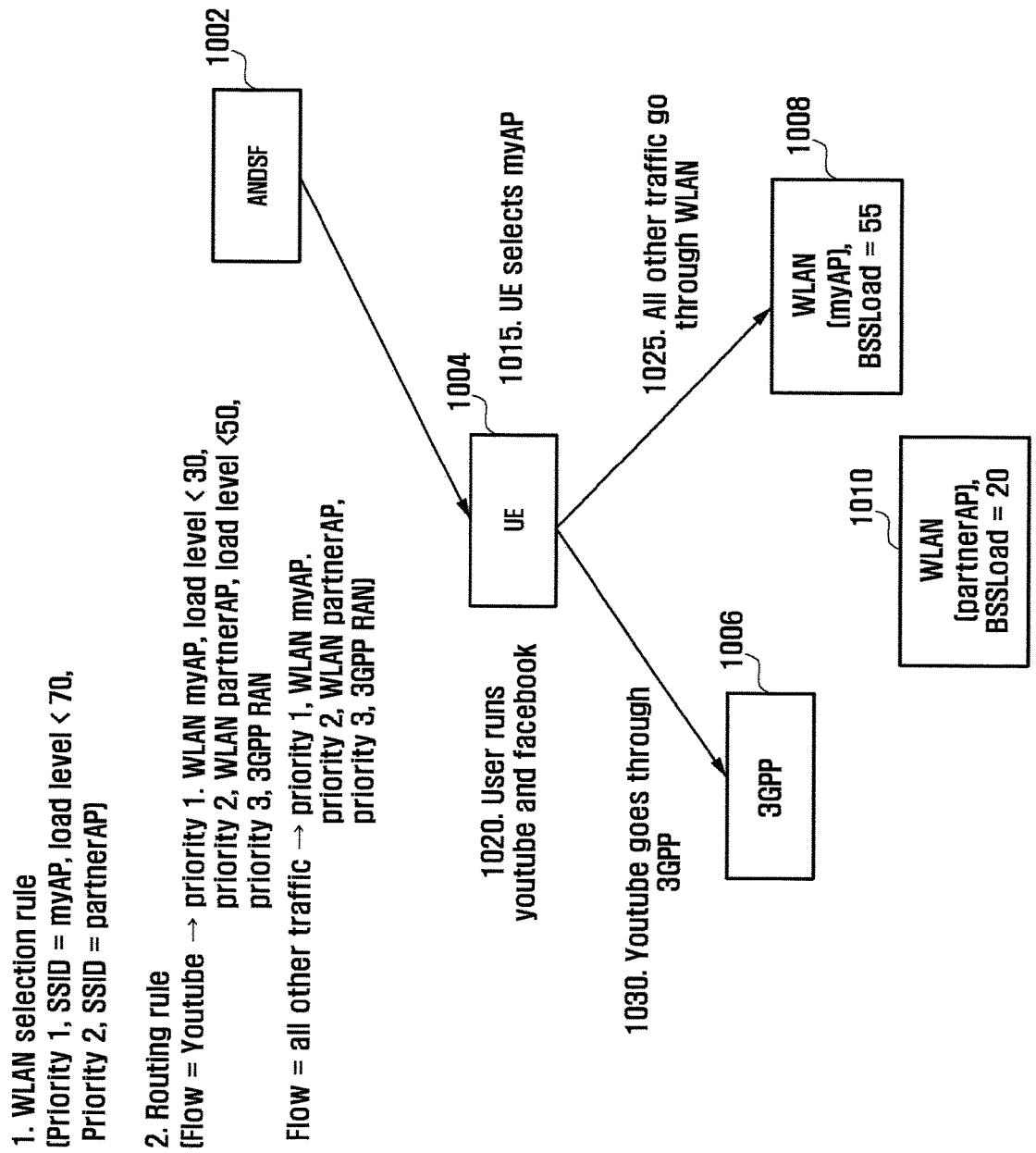
FIG. 10 illustrates an operation according to a third embodiment of the present specification.

FIG. 10 illustrates an operation according to a third embodiment of the present specification.

Referring to FIG. 10, in a third embodiment, data can be transmitted/received between an ANDSF 1002, a UE 1004, a 3GPP 1006, a WLAN 1008, and a WLAN 1010.

In more detail, the ANDSF 1002 can transmit/receive data including related policy information to/from the UE 1004. The WLAN 1008 may be a WLAN managed by an operator who manages the 3GPP 1006 or a WLAN equivalent thereto, and the WLAN 1010 may be a WLAN which can be used by a contract with a service operator who manages the 3GPP 1006.

In an embodiment, a WLAN selection policy and a traffic offloading policy are configured in the UE 1004. The WLAN selection condition has a configuration in which the WLAN 1008 corresponds to NSWO, has a priority of 1, and can be used when a BSS load level is lower than 70, and the WLAN 1010 having an SSID of "partnerAP" corresponds to NSWO and has a priority of 2. The traffic offloading policy for "NonSeamlessOffloading" has a configuration in which, with regard to a data flow #1 (e.g. "abc.com"), a priority of 1 corresponds to "myAP" having BSS load lower than 30, a priority of 2 corresponds to "partner AP" having BSS load lower than 50, and a priority of 3 corresponds to a 3GPP 1006 access network which is not a WLAN.

Meanwhile, with regard to a data flow #2 (e.g. "xyz.com"), a priority of 1 corresponds to "myAp" 1008, a priority of 2 corresponds to "partner AP" 1010, and a priority of 3 corresponds to an 3GPP 1006 access network. In this situation, when the UE scans a WLAN, the "myAP" 1008 and the "partnerAP" 1010 are searched for, and it can be assumed that a BSS load state of the "myAP" 1008 is 55 and a BSS load state of the "partnerAP" 1010 is 20.

In step 1015, the UE 1004 can select and be connected to the "myAP" 1008 having a priority of 1 and satisfying a BSS load state according to a WLAN selection rule in the previously performed WLAN selection process.

In step 1020, the UE can detect execution of a service using "abc.com" and a service using "xyz.com".

Thereafter, the UE 1004 performs a traffic offloading selection process. At this time, with regard to flow #1, a BSS load state of the currently selected "myAP" 1008 is not satisfied. Thus, in step 1030, the 3GPP 1006 access network which is a connectable access network having the highest priority is selected and transmission is performed therethrough. With regard to flow #2, an offloading condition with respect to the currently selected "myAP" 1008 having the highest priority does not exist separately, and thus, data can be transmitted/received through the "myAP" 1008, in step 1020.

Meanwhile, the offloading using the WLAN may be largely classified into two types according to a network configuration of an operator.

One kind is NSWO, and the NSWO includes a case where, since a WLAN is not connected to a core network entity (e.g. ePDG or PGW) of an operator network, traffic is directly offloaded to the Internet.

In contrast, in a case of Seamless WLAN Offloading (SWO), since a WLAN is connected to a core network entity of an operator network, an operator intra-network service (e.g. an IMS-based service) can be used, and a session continuity in which an IP address is maintained between the 3GPP access network and the WLAN can be supported as needed.

When the SWO is used, there may be two kinds of network configurations specifically classified. The first case among the two kinds of network configurations may correspond to a home routed case where data is transmitted/received through a home operator in a state in which a WLAN interworks with a PGW of the home operator HPLMN, and the second case corresponds to a Local Break-Out (LBO) case where data is transmitted/received through a roaming operator in a state in which a WLAN interworks with the roaming operator VPLMN.

In this way, there are different kinds of WLANs according to a network configuration of an operator, and it can be determined which operator's core network is used to actually transmit traffic. Thus, an operator can configure a policy for which kind of WLAN is preferentially selected, when configuring a rule for WLAN offloading with regard to a UE.

An ANDSF server of the operator network can transmit a policy of a type of a WLAN together with the above-described WLANSP to the UE so as to configure an operation of the UE. In the description of an embodiment of the present specification, it is exemplified that the additional information is provided as a policy called a Connection Type Policy (CTP) separately from the WLANSP. However, the subject matter of the present specification does not depend on a specific structure of the ANDSF MO, and may include a case where additional information is transmitted with another structure through a slight change. For example, information included in the CTP may be transmitted while being included as a part of the WLANSP. According to an embodiment, the CTP may be called another name including similar information, and more specifically, may be called "HomeOperatorPreference".

Figure 12:
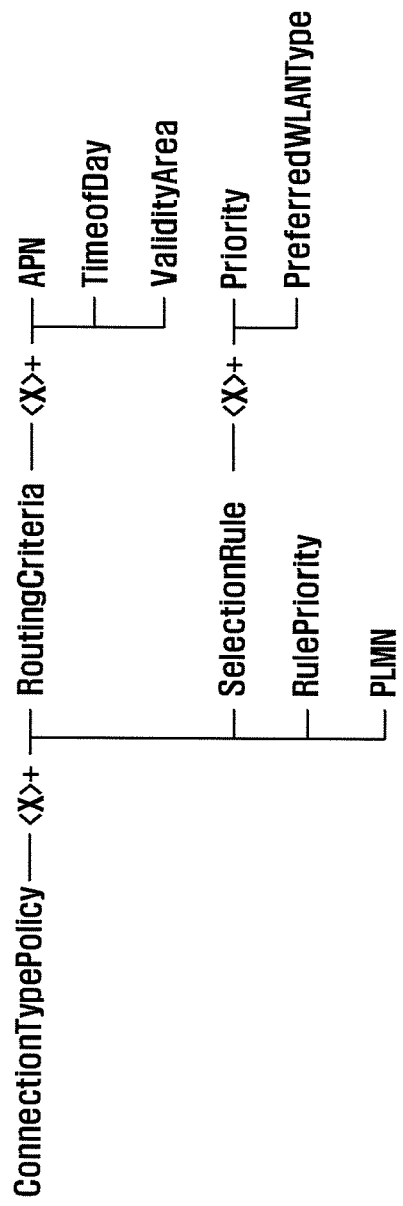
FIG. 12 illustrates a structure of a CTP according to an embodiment of the present invention.

FIG. 12 illustrates a structure of a CTP according to an embodiment of the present invention. Referring to FIG. 12, the CTP may include one or more rules for a type of a WLAN which can be selected by the UE.

One rule may include a value ("RulePriority") indicating a priority between a plurality of CTP rules when there are the plurality of CTP rules and a PLMN ID of an operator who generates a rule.

When a CTP is always transferred only by a home operator, a PLMN ID field may not be used. Further, the rule may include a condition ("RoutingCriteria") used when whether one CTP rule is valid is determined.

A condition for determining validity may include an APN, a time, a location condition, and an "IPFlow" (the "IPFlow" may include information by which an IF flow can be distinguished, and the information may include one or more of a transmission/reception IP address, a port, a protocol type, an application ID, and a domain name). In an embodiment, the UE determines that the corresponding rule is valid when one or more conditions among the valid conditions are satisfied or all the valid conditions are satisfied. Further, some necessary conditions among the "RoutingCriteria" may be configured to be directly included in the CTP. For example, the CTP rule may include a valid area condition ("ValidityArea") and a value time condition ("TimeOfDay") as lower information instead of the "RoutingCriteria".

For example, when the APN is included as a valid condition, the UE determines that the corresponding rule is valid only when an APN of a currently generated PDN connection coincides with the APN. The CTP rule includes one or more selection rules ("SelectionRule") for selecting an actual connection type of a WLAN. The selection rule may include a preferred connection type of a WLAN and a priority value therefor. Connection types of the WLAN may include:

WLAN interworks with an operator core network and supports Home Routed (e.g. S2a with Home Routed)
    WLAN interworks with an operator core network and supports LBO (e.g. S2a with LBO)
    WLAN interworks with an operator core network (e.g. S2a with either Home Routed or LBO)
    WLAN does not interwork with an operator core network (e.g. NSWO)

The above-mentioned APN or IPFlow information may be configured by not the "RoutingCriteria" but a separate field and transmitted. Further, as a simpler form, the CTP may include only information indicating whether a WLAN connection through S2a is preferred, e.g. an S2a Connection Preference field. From now, an operation of selecting a WLAN by a UE according to the present specification will be described. It can be assumed that the following two CTP rules are transferred to the UE.

Rule Priority=1, Routing Criteria=(When there is a PDN connection of which APN is "IMS"), SelectionRule= {(Priority 1, S2a with Home Routed), (Priority 2, S2a with LBO), (Priority 3, NSWO)}
    Rule Priority=2, Routing Criteria=(When there is a PDN connection of which APN is "Internet"), SelectionRule={(Priority 1, NSWO), (Priority 2, S2a with either Home Routed or LBO)}

Rule Priority=3, Routing Criteria=(When there is no PDN connection of which APN is "IMS"), SelectionRule={(Priority 1, NSWO), (Priority 2, S2a with either Home Routed or LBO)}

The UE, which has received the above policy, selects a valid rule having the highest rule priority. When the UE has a PDN connection of which the APN is an IMS, the UE should select a rule having a rule priority of 1 according to the policy, and accordingly, should most preferentially select a WLAN connected to a core network in which the "Home Routed" is supported.

When the CTP is configured in a simple form as described above (i.e. the CTP includes "S2a Connection Preference", "RulePriority", "ValidityArea", and "TimeofDay"), the UE should be operated by the rule having the highest priority from among rules in which effective conditions ("ValidityArea" and "TimeofDay") are satisfied. At this time, when the "S2a Connection Preference" field of the rule is configured such that an S2a connection is preferred, the UE selects a WLAN supporting the S2a connection, or else, when selecting a WLAN, the UE needs not to consider whether the S2a connection is supported.

When the CTP is transmitted separately from the WLANSP, the selecting of the WLAN is actually performed using the WLANSP. At this time, which type of connection is supported by one WLAN is inquired/answered using an ANQP procedure. When the UE tries to select the WLAN according to the WLANSP, if a valid WLAN is not selected, the UE should select one of WLANs supporting S2a/LBO according to the next priority. When the UE cannot also select one of the WLANs, the UE can select one of WLANs supporting the NSWO having the last priority.

When the UE does not have a PDN connection of which the APN is an IMS or the Internet, since the rules having the priorities of 1 and 2 are invalid, the UE should select a rule having a third priority. As in this example, information on the APN or the "IPFlow" indicating validity of the rule or a traffic condition of a user may be used as a concept of a blacklist. In this case, the UE should preferentially select a WLAN supporting the NSWO by using the WLANSP, and when it is impossible to select a WLAN, the UE should select a WLAN supporting S2a.

When there is no rule satisfying a valid condition, the UE may be configured to preferentially select a WLAN supporting the NSWO or preferentially select a WLAN supporting the S2a.

The CTP may be implemented in a simpler form.

Figure 13:
FIG. 13 illustrates an example of a CTP configuration according to an embodiment of the present specification.

FIG. 13 illustrates an example of a CTP configuration according to an embodiment of the present specification.

Referring to FIG. 13, when a CTP as in an embodiment is transferred, the UE simply configures each priority according to a connection type (one of four types described below) of a WLAN preferred by a home operator, without a valid condition. For example, Priority 1, S2a with Home Routed
Priority 2, S2a with LBO
Priority 3, S2a with either Home Routed or LBO
Priority 4, NSWO When the above policies are transferred, the UE should preferentially select a WLAN interworking with a core network supporting the "home routed".

The CTP is more simplified and thus, may be configured to indicate one connection type of a WLAN most preferred by the home operator.

Meanwhile, as mentioned above, the WLANSP for selecting a WLAN and a policy for configuring a form of a suitable WLAN may be configured to be combined with each other.

Figure 14:
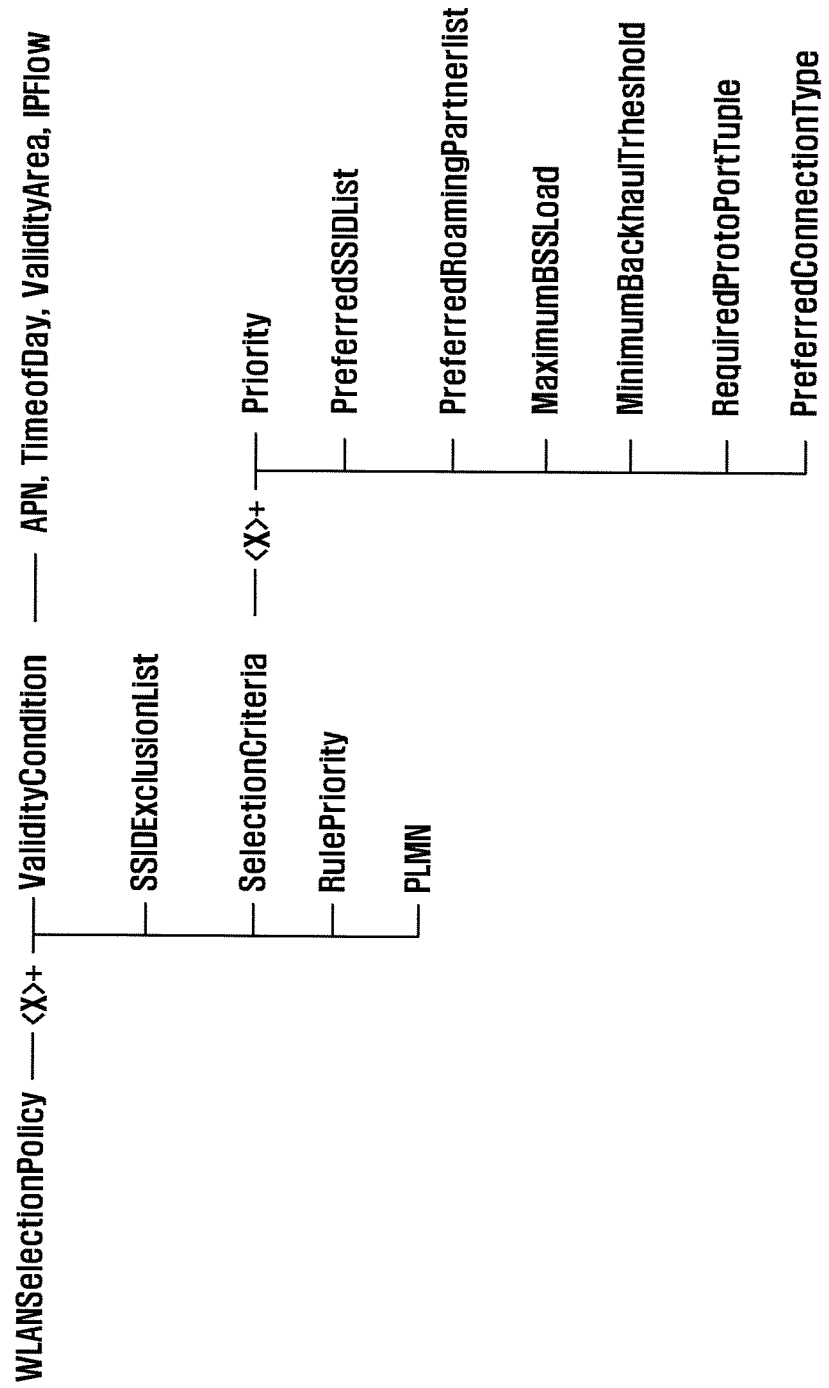
FIG. 14 illustrates a configuration of a WLANSP according to an embodiment of the present specification.

FIG. 14 illustrates a configuration of a WLANSP according to an embodiment of the present specification.

Referring to FIG. 14, in a configuration of the WLANSP, in order to allow the above-described WLANSP to include a policy for a connection type of a WLAN preferred by an operator, an APN (or an "IPFlow" condition) is added to a validity condition, and a "PreferredConnectionType" is added to a selection criterion. An operation of receiving such a WLANSP by the UE can be performed similarly to the above description.

That is, the UE can determine a validity of a rule according to the APN (or the "IPFlow") of a currently generated PDN connection, and can preferentially select a WLAN having a connection type preferred by an operator additionally to the existing selection criterion when a WLAN is selected according to a valid rule. For example, when the following policy is configured in the UE, Rule Priority=1, PLMN=HPLMN, ValidityCondition=(APN="IMS"), SelectionCriteria={(Priority=1, MaximumBSSLoad=64, PreferredConnectionType=S2a with Home Routed), (Priority=2, MaximumBSSLoad=128)}

When there is a PDN connection having an APN of "IMS", the UE can apply the rule, preferentially support "Home Routed", interwork with a core network, select a WLAN of which a congestion level is lower than 64 from among WLANs supporting "S2a", and when it is impossible to perform the selection, select a WLAN of which a congestion level is lower than 128.

Meanwhile, adding the APN (or the "IPFlow" condition) to the validity condition and adding information on the connection type to the selection criterion may be allowed only to the WLANSP provided by a home operator. At this time, when the UE receives the WLANSP having such a configuration from not the home operator but another operator, the UE can ignore this.

In this way, when the third embodiment of the present invention is used, since a WLAN is firstly selected according to a specific condition and whether traffic is offloaded or not is determined, a problem that the UE frequently changes a WLAN to be used can be solved. Further, since a condition applied when a WLAN is selected and a condition applied when traffic is offloaded or not through the selected WLAN can be differently configured, it is possible to perform more segmentalized and accurate traffic offloading.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

What is claimed is:

1. A method performed by a terminal in a wireless communication system, the method comprising:
obtaining first policy information for selecting a wireless local area network (WLAN);
identifying whether an S2a connectivity preference is set based on home operator preference related information;

selecting a WLAN supporting an S2a connectivity from at least one WLAN based on the first policy information and the home operator preference related information in case that the S2a connectivity preference is set;

identifying whether a priority of the WLAN is higher than a priority of a cellular network based on second policy information; and establishing a connection over the WLAN in case that the priority of the WLAN is higher than the priority of the cellular network.

2. The method of claim 1, wherein the selecting further comprises selecting a WLAN without considering the S2a connectivity, in case that a WLAN supporting the S2a connectivity is not discovered.

3. The method of claim 1, wherein the WLAN is selected based on the first policy information and the home operator preference related information, in case that a user preference is not configured for the terminal or a user preferred WLAN is not discovered.

4. The method of claim 1, further comprising establishing the connection over the cellular network based on the second policy information, in case that the priority of the WLAN is equal to or lower than the priority of the cellular network.

5. The method of claim 1, further comprising determining whether the connection over the WLAN meets the first policy information while the connection being established.

6. The method of claim 1, wherein the first policy information is determined to be valid based on a valid area and a valid time for a network node.

7. A terminal in a wireless communication system, the terminal comprising:
a transceiver configured to transmit and receive a signal; and
a controller configured to:
obtain first policy information for selecting a wireless local area network (WLAN),
identify whether an S2a connectivity preference is set based on home operator preference related information,
select a WLAN supporting an S2a connectivity from at least one WLAN based on the first policy information and the home operator preference related information in case that the S2a connectivity preference is set,
identify whether a priority of the WLAN is higher than a priority of a cellular network based on second policy information, and
establish a connection over the WLAN in case that the priority of the WLAN is higher than the priority of the cellular network.

8. The terminal of claim 7, wherein the controller is further configured to select a WLAN without considering the S2a connectivity, in case that a WLAN supporting the S2a connectivity is not discovered.

9. The terminal of claim 7, wherein the WLAN is selected based on the first policy information and the home operator preference related information, in case that a user preference is not configured for the terminal or a user preferred WLAN is not discovered.

10. The terminal of claim 7, wherein the controller is further configured to establish the connection over the cellular network based on the second policy information, in case that the priority of the WLAN is equal to or lower than the priority of the cellular network.

11. The terminal of claim 7, wherein the controller is further configured to determine whether the connection over the WLAN meets the first policy information while the connection being established.

12. The terminal of claim 7, wherein the first policy information is determined to be valid based on a valid area and a valid time for a network node.

* * * * *